United States Patent [19]

Broadway et al.

[11] 4,138,619

[45] Feb. 6, 1979

[54] ALTERNATING CURRENT ELECTRIC MOTORS AND GENERATORS

[75] Inventors: Alexander R. W. Broadway; William Fong; Gordon H. Rawcliffe, all of Bristol, England

[73] Assignee: National Research Development Corporation, England

[21] Appl. No.: 737,688

[22] Filed: Nov. 1, 1976

Related U.S. Application Data

[63] Continuation of Ser. No. 581,280, May 27, 1975, abandoned.

[30] Foreign Application Priority Data

Jun. 12, 1974 [GB] United Kingdom ............... 26040/74

[51] Int. Cl.² ............................................ H02K 3/00
[52] U.S. Cl. .................................. 310/184; 310/198; 310/207; 318/773
[58] Field of Search ................. 310/179, 49, 180, 184, 310/195, 198, 200–208; 318/224 R

[56] References Cited

U.S. PATENT DOCUMENTS

| | | |
|---|---|---|
| 3,175,144 | 3/1965 | Rawcliffe .......................... 318/224 R |
| 3,308,363 | 3/1967 | Rawcliffe .......................... 318/224 R |
| 3,515,922 | 6/1970 | Fong .................................... 310/202 |
| 3,794,870 | 2/1974 | Broadway .......................... 310/180 |
| 3,898,543 | 8/1975 | Broadway .......................... 318/224 R |
| 3,949,253 | 4/1976 | Broadway .......................... 310/203 |
| 4,013,909 | 3/1977 | Broadway .......................... 318/224 R |

Primary Examiner—R. Skudy
Attorney, Agent, or Firm—Larson, Taylor and Hinds

[57] ABSTRACT

Three-phase, alternating current, pole-amplitude modulation (P.A.M.) pole-changing electric motors or generators having series/parallel connection of phase winding parts for the alternate pole-members. To obtain approximately equal air-gap flux-density for both pole-numbers, selected coils are provided in branch connection with the main phase winding parts and switched in circuit for one pole-number only. Such selection, to be consistent with normal coil-reversal requirements of pole-changing by P.A.M., is shown to necessitate branch coils represented by similarly angularly positioned vectors in each phase-winding and of equal number in the reversed and non-reversed phase-winding parts.

10 Claims, 7 Drawing Figures

○ BRANCH COILS OMITTED FROM CIRCUIT FOR 8-POLE OPERATION

○ BRANCH COILS OMITTED FROM CIRCUIT FOR 8-POLE OPERATION

ALTERNATING CURRENT ELECTRIC MOTORS AND GENERATORS

This is a continuation of application Ser. No. 581,280 filed May 27, 1975, now abandoned.

This invention relates to alternating current electric motors and generators, particularly to 3-phase machines providing alternative running pole-numbers, in close-ratio, by the method of pole-amplitude modulation (P.A.M.) Both close-ratio and wide-ratio, 3-phase, pole-amplitude modulation, 2-speed motors have now been widely described and used. In such close-ratio machines particularly one object of the design is to obtain approximately the same air-gap flux density for both pole-numbers. Ideally, the air-gap flux-density should be very slightly above unity for falling-torque drives, such as for fan motors, and very slightly below unity for constant-torque drives.

For falling-torque drives, it is desirable for the coil-pitch for the lower of the two pole-numbers to be very near to full pitch. This permits of the maximum possible torque output at the higher speed, for a given size of motor.

The air-gap flux-density ratio, for the two pole numbers, is given by:

$$\frac{B_1}{B_2} = \left[\frac{P_1}{P_2}\right] \times \left[\frac{2}{\sqrt{3}}\right] \times \left[\frac{W_2}{W_1}\right] \quad (1)$$

where $B_1$ is the air-gap flux-density at the lower pole-number;
where $B_2$ is the air-gap flux-density at the higher pole-number;
$P_1$ is the lower pole-number;
$P_2$ is the higher pole-number;
$W_1$ is the winding factor at the lower pole-number;
$W_2$ is the winding factor at the higher pole-number.

Equation (1) relates to parallel-star/delta phase interconnections. For parallel-star/star interconnections, the term $$\left[\frac{2}{\sqrt{3}}\right]$$

is replaced by the term $$\left[\frac{2}{1}\right]$$

In general, the winding factor for $P_1$ poles, $W_1$, for a good falling-torque design, can be made as high as 0.86. The winding factor for $P_2$ poles, $W_2$, will be rather lower. Equation (1) above makes it clear that the air-gap flux-density ratio is influenced directly by the ratio $[P_1/P_2]$.

When $[P_1/P_2]$ is, for example, 4/6, or is some other comparable ratio, the desired value of $[B_1/B_2]$ can be obtained by using parallel-star/star connection. In this case, the $[\sqrt{3}]$ term is omitted in Equation (1), as stated above.

When $[P_1/P_2]$ is, for example, 6/8, or is some other comparable ratio, the value of $[B_1/B_2]$ which is obtained by using parallel-star/star connection is too high; and the value obtained by using parallel-star/delta connection is too low.

The object of the present invention is to provide alternative means for adjusting the air-gap flux-density at one of the two pole numbers, so that a desired ratio for the air-gap flux-density for the two pole-numbers may be obtained.

Accordingly, one form of the invention provides for a 3-phase alternating current, pole-amplitude modulation pole-changing electric machine, motor or generator, having a 3-phase stator winding comprising three phase-windings, each phase-winding having two phase-winding parts, comprising most coils but not all coils of the phase winding, which parts are serially connected together for a first pole-number and connected together in parallel for a second pole-number; a method of connecting the said coils of each phase-winding to provide an air-gap flux density ratio, for the two pole-numbers, which is close to unity, consisting in modifying the said machine from a form in which said coils are identical throughout and are all energized for each pole-number, in that the said two phase-winding parts together comprise all coils of the phase-winding, by excluding selected coils from circuit in the said connection for one pole number; the said selection comprising determining the slot-vectors for all coils of all three phase-windings when all coils are energised in the said parallel connection, thereby to define three adjoining phase vector groups, one group for each phase, each group subtending 120° around the stator winding periphery and selecting the said selected coils in groups of three pairs, each pair of the three pairs occupying a corresponding vector angular position within each of the three said phase vector groups, each coil of a pair occupying the same vector angular position in the same phase vector group, one coil of the pair being selected from that phase-winding part which is reversed in circuit by said alternative series/parallel connections and the other coil of the pair being selected from that phase-winding part which is not reversed in circuit thereby.

Another form of the invention provides a 3-phase alternating current, pole-amplitude modulation pole-changing, electric machine, motor or generator, having a 3-phase stator winding comprising three phase-windings, each including two phase-winding parts, which parts are serially connected together for a first pole-number and connected together in parallel for a second pole-number, said phase-winding parts including most coils of the phase-winding concerned but excluding selected coils thereof, said selected coils being excluded from circuit in the said connection for one pole-number, said selected coils together comprising at least one group of three coil-pairs, one coil-pair from each phase-winding, the coil-pair of each phase-winding representing corresponding slot-vector angular positions within the corresponding phase vector group, and the two coils of each pair representing the same slot-vector angular positions.

Conveniently, the said coils comprise a branch circuit of each phase-winding, additional to the said two phase-winding parts, and are excluded from circuit in the series connection mode of the said phase-winding parts.

In order that the invention may readily be carried into practice, two embodiments will now be described in detail, by way of example, with reference to the accompanying drawings, in which.

In the 3-phase, pole-amplitude moduation, pole-changing machines now used, pole-changing is effected by the reversal, in current-carrying sense, of selected coils of each phase winding, this reversal being effected by alternative series and parallel connection of phase-winding parts and, as one example, alternative parallel-star/star connections of the whole 3-phase stator winding.

The present invention is applicable particularly to 6-pole/8-pole machines and to 8-pole/10 -pole machines and, of these pole combinations, more particularly applicable to 6-pole/8-pole machines. Accordingly, both examples particularly described herein are 6-pole/8-pole machines.

For 6-pole/8-pole machines, the technique described is used to lower the air-gap flux-density ratio, $B_6/B_8$, whilst retaining the usual parallel-star/star phase-interconnection.

For 8-pole/10-pole machines, however, the normal, and best, phase-interconnection is parallel-star/delta. Then, however, the corresponding value of $B_8/B_{10}$ is rather too low, usually below unity. If the phase-interconnection were merely changed to parallel-star/star, this change would, by itself, make the ratio $B_8/B_{10}$ much too high. By combining the change of phase-interconnection to parallel-star/star, with coil-omission for 10 poles, an acceptable value of $B_8/B_{10}$, somewhat above unity, is obtained.

In such machines, the object of the invention is achieved by omitting selected phase-winding coils at the lower speed, that if the higher pole-number $P_2$, whereby the effective value of $W_2$, see Equation 1, is reduced. Omission of these coils is effected by the circuit of FIG. 1.

Figure 1:
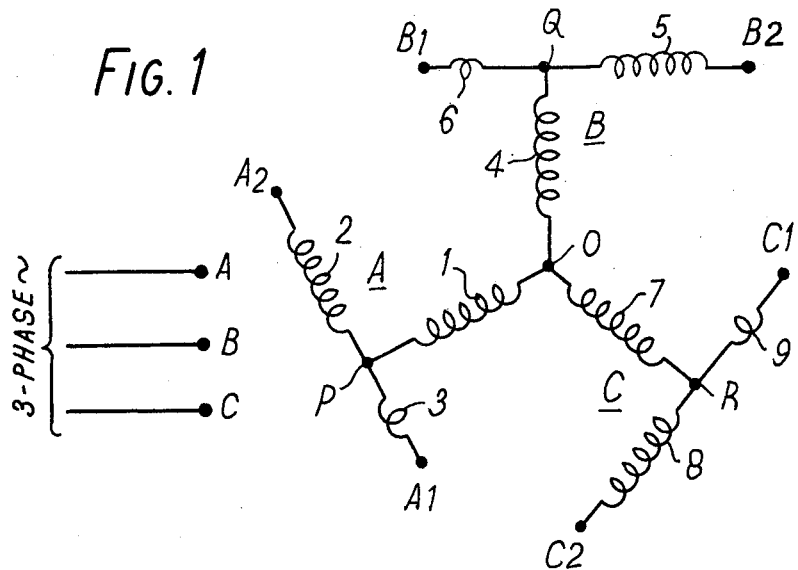
FIG. 1 is a circuit diagram of a 3-phase stator winding comprising three phase-windings each with two phase-winding parts, adapted for connection in series or in parallel, and a branch winding part.

As shown in FIG. 1, a pole-amplitude modulation, 3-phase winding comprises three phase-windings. Phase-winding A comprises two winding parts 1, 2, respectively connected between terminals O,P and P,A2, together with a branch winding part 3 connected between terminals P,A1. Phase-winding B similarly comprises two winding parts 4 and 5 and a branch winding part 6, respectively connected between terminals O,Q; Q,B2 an Q.B1. Phase-winding C similarly comprises two winding parts 7 and 8 and a branch winding part 9, respectively connected between terminals O,R; R,C2 and R,C1.

Operated as a motor at $P_1$ poles, the 3-phase supply terminals A, B and C are connected to winding terminals A1, B1 and C1. Terminals A2, B2 and C2 are joined together.

Operated at $P_2$ poles, the 3-phase supply terminals A, B and C are connected to winding terminals A2, B2 and C2. Terminals A1, B1 and C1 are isolated.

Thus, it will be seen that all the winding parts are included in circuit for rhe parallel-star connection for $P_1$ poles, but the branch winding parts 3, 6 and 9 are excluded from circuit in the series-star connection for the lower speed of $P_2$ poles. By this means, it is possible to obtain an air-gap flux-density ratio, at the two speeds, of the desired value, that is just above unity.

Such removal of coils from circut will have virtually no resultant effect on the continuous power rating for $P_2$ poles. There will be a higher flux-density in the machine, but the same stator current for a given load, though flowing in the reduced number of coils which remain in circuit. The rotor current will be reduced.

In the second order, the iron losses will be slightly increased, and the stator and rotor copper losses appreciably reduced. On balance, this is marginally advantageous. The really substantial resultant improvement will be in the $P_2$-pole starting torque, which is proportional to the square of the flux-density at starting, and inversely proportional to the short-circuit impedance. By taking coils out of circuit, the flux-density is increased and the short-circuit impedance is reduced. The increase in starting torque is thus very considerable.

In design of any particular machine according to the present invention, the design of the basic machine has first to be considered, according to the principles of design of pole-amplitude machines already known, and the selection of phase-winding parts for the said two winding parts, for examples parts 1 and 2 of phase-winding A of FIG. 1, and the selection of coils for the branch winding part 3, of this example.

This design process will now be fully described with reference to FIGS. 2 to 4 and FIGS. 5 to 7.

Figure 2:
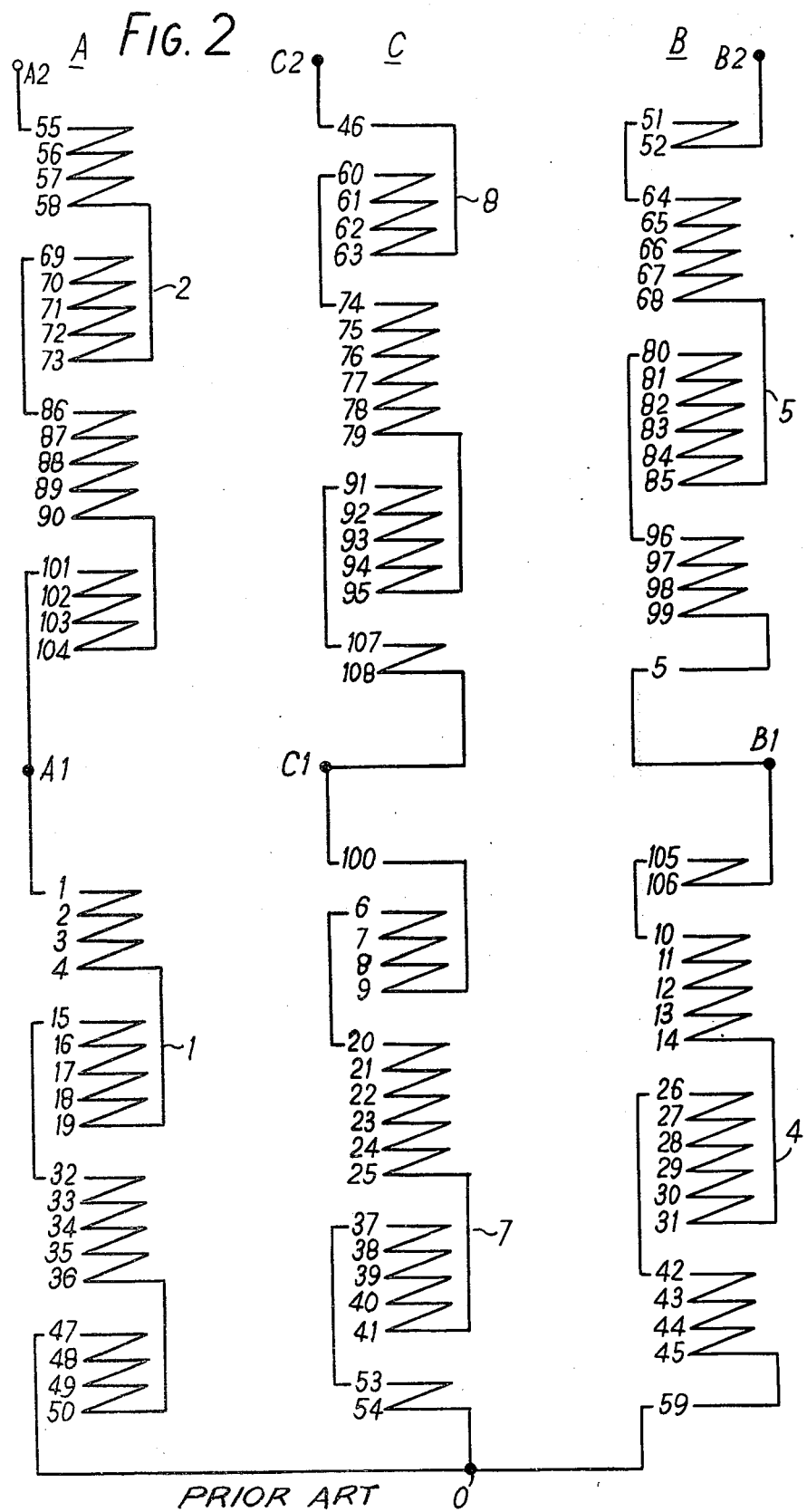
FIG. 2 is a winding diagram of the stator winding of a 6-pole/8-pole, 3-phase, pole-amplitude modulation machine, wound in 108 slots; a prototype winding and not a winding according to the present invention.

In FIG. 2, there is shown the winding diagram of a 3-phase, 6-pole/8-pole stator winding wound in a 108-slot stator. The coil pitch is 19 slots. Using reference numerals similar to those of FIG. 1, the winding of FIG. 2 comprises solely two winding parts in each phase. Phase-winding A comprises parts 1 and 2, respectively connected between terminals O, A1 and A1, A2. Phase-winding B similarly comprises the two parts 4 and 5, respectively connected between terminals O, B1 and B1, B2. Phase-winding C similarly comprises parts 7 and 8, respectively connected between terminals O, C1 and C1, C2.

For 6-pole operation, the 3-phase supply terminals are connected to winding terminals A1, B1 and C1. Terminals A2, B2 and C2 are joined together.

For 8-pole operation, the 3-phase supply terminals are connected to winding terminals A2, B2 and C2. Terminals A1, B1 and C1 are isolated.

This arrangement provides a 2-speed motor with a 6-pole winding factor of 0.867 and an 8-pole winding factor of 0.664. The air-gap, flux-density ratio $B_6/B_8$ is 1.15. This ratio is considered too high and a reduction of at least 10% is indicated. Since flux-density is inversely proportional to the number of coils, this fact indicates a requirement for the removal from circuit of some of the coils of each phase-winding in the connection for the lower speed of 8-poles.

It is required to remove coils from circuit at the higher pole-number while providing a substantially balanced winding for both pole-numbers. To this end, the complete slot-vector diagram is drawn for the basic winding, for example of FIG. 2, for the 8-pole connection.

Figure 3:
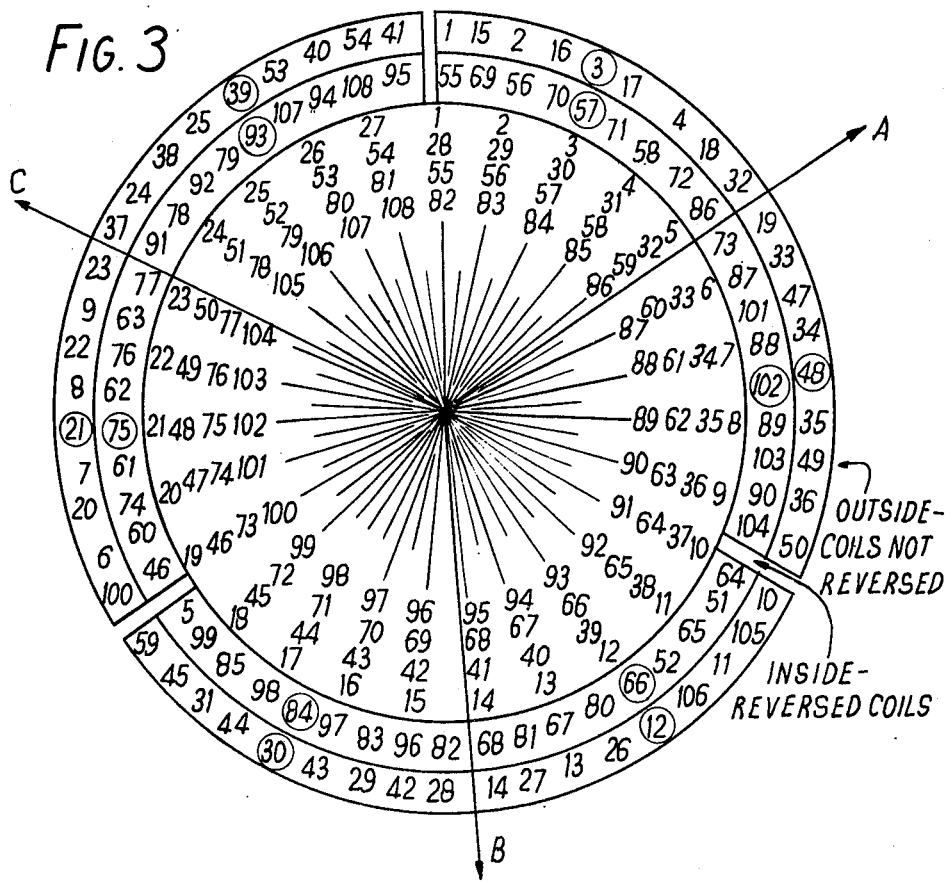
FIG. 3 is the 8-pole slot-vector diagram of the machine of FIG. 2; with omitted coils.

FIG. 3 shows the 8-pole, slot-vector diagram for the winding of FIG. 2. The effective layer (spread) factor is 0.735. The phase-sequence is A,B,C. The reversed coils and the "non-reversed" coils of each phase-winding are represented separately, the reversed coil forming the inner circle of references and the "non-reversed" coils, the outer circle.

Provided that coils which correspond in vector position are removed from each phase-winding and from both the "reversed" and the "non-reversed" halves of each phase-winding in equal measure, the resultant winding will still be balanced, in the connections for both of the pole-numbers.

The total number of coils to be removed can, in practice, be estimated with fair certainty before removal is effected, though there is some correlation between the number to be removed, and the vector positions of those coils chosen for removal. At the most, there is unlikely to be more than one alternative for the total number of coils which should be removed.

Much more important is the selection of those coils whose removal will improve the m.m.f. waveforms for 8-pole working. Removal of any specific coil can cause either an improvement or a deterioration in this respect. A tentative selection of a particular coil for removal from circuit having been made, the effect of removal on the m.m.f. waveform, and on the effective number of coils, can rapidly be determined by computer. In practice, those skilled in the art can complete the whole process quite quickly; and a set of possible alternatives can be compared, and the best then chosen.

The above explanation assumes that the basic winding, in this example the winding of FIG. 2, is exactly balanced for both pole-numbers, as is very commonly the case, particularly for large machines. If the balance for 8-poles is not absolutely exact, the vector diagram is a little more complicated, the selection of coils for removal is slightly more difficult, and the number of alternatives may be reduced. The principle described is not altered, even when there was a nominal degree of unbalance. Appreciable unbalance is, of course, never at issue.

The process of flux-equalization described can be applied with equal facility to P.A.M. windings which use "difference" modulation and to P.A.M. windings which use "sum" modulation. In either case, a full design is carried through, according to the known P.A.M. methods. This having been done, the coil-omission procedures described above can be applied in exactly the same way for either type of modulation. One thus may obtain a better P.A.M. winding than would have been possible without coil-omission.

The coils thus selected for removal from circuit for 8-pole working are connected as branches 3, 6 and 9, see FIG. 1, correspondingly to the phase-winding to which they belong. Accordingly, they are excluded by the series-star connection for 8-poles. All coils are included in the parallel-star connection for 6-poles.

For 6-poles, these omitted coils would normally have been in circuit in two parallel paths; but it is not possible to leave the branch coils connected in two parallel paths, when the remainder of the winding is used in series for 8-poles. If parallel connection were used, there would be heavy circulating currents around each branch.

It is therefore further necessary to wind all the coils of branches 3, 6 and 9, FIG. 1, which have to be removed from circuit, so that they have half the number of turns which the other coils have, but so that the turns are of double cross-section. Each branch coil carries the full load current in the 6-pole connection, whereas the remaining coils each carry half the load current. There is, however, virtually no difficulty in arranging for these special coils, since their overall physical size is exactly the same as that of the other coils.

Referring again to FIG. 3, the coils chosen for omission for 8-pole working have the corresponding slot reference, see also FIG. 2, shown in a circle.

If the vectors of the removed coils are near the centre of each set of phase vectors, the reduction in winding factor will be greater than if the vectors of the removed coils are near the edges of each set of phase vectors.

With these considerations in mind, a pair of coils corresponding to the central vectors is selected for omission from each half phase-winding. The m.m.f. waveform and the resultant winding factor $W_2$ are then computed.

The pairs of coils spaced apart by 3, 5, 7, 9, 11 (etc.) vectors may then be considered. It rapidly becomes clear that an excellent waveform, and almost the ideal air-gap flux-density ratio, are obtainable by removing two pairs of coils spaced apart by 9 vectors: that is, by 60°. These coils are:

Nos. 3, 48, 57 and 102 from Phase A
Nos. 12, 30, 66 and 84 from Phase B
Nos. 21, 39, 75 and 93 from Phase C These are the coils marked by circles on the vector diagram of FIG. 3.

This arrangement gives a balanced winding for 8-poles, the winding for 6-poles being effectively unchanged.

Figure 4:
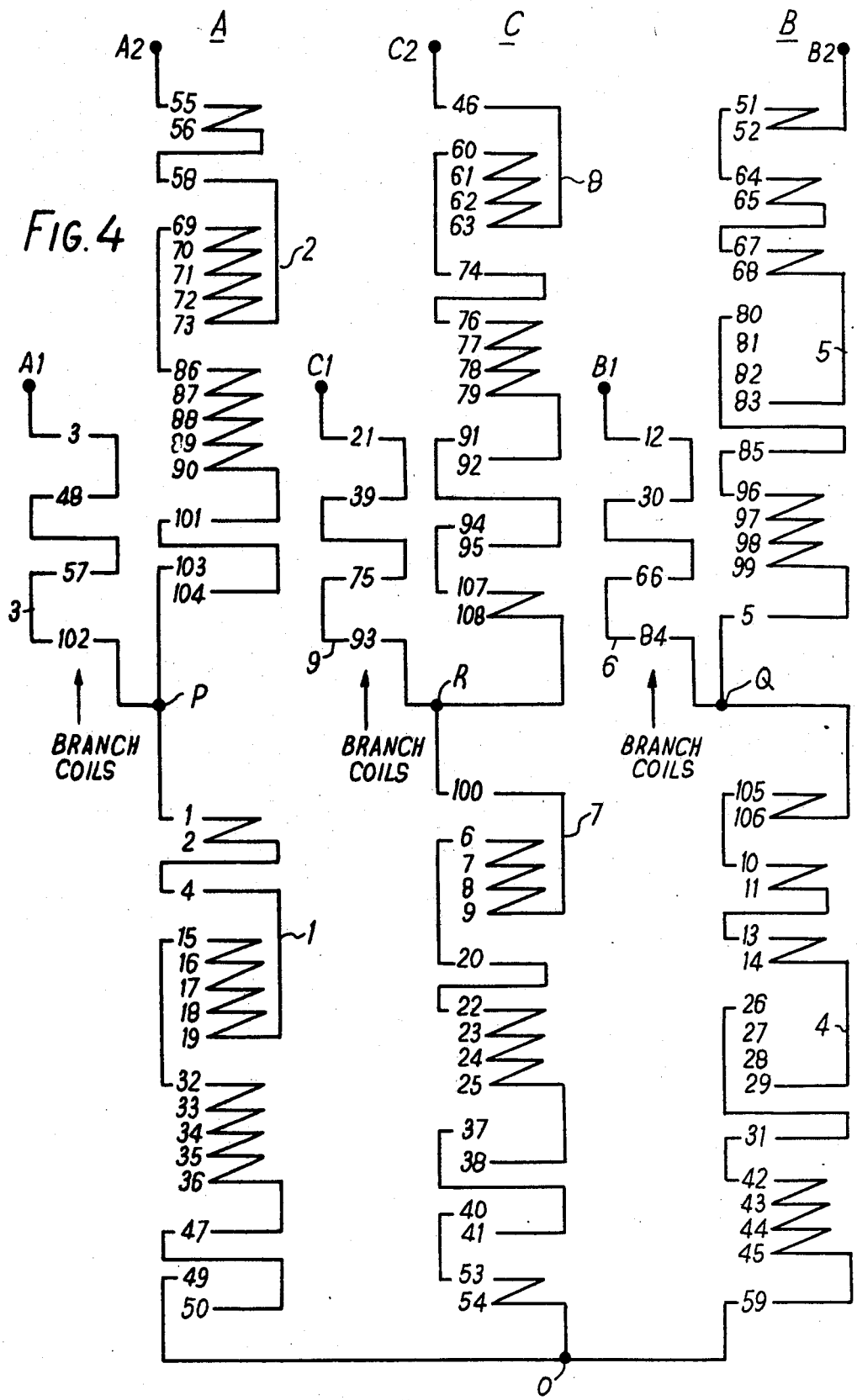
FIG. 4 is a winding diagram of a 6-pole/8-pole machine according to the invention, using the stator winding circuit of FIG. 1.

FIG. 4, which is to be compared with both the winding diagram of FIG. 2 and the circuit diagram of FIG. 1, shows the disposition of all coils of all three phase-windings in the two main winding parts and in the branch part of each phase-winding. The slot number references correspond to FIG. 2, and FIG. 3, while the terminal references and winding part references correspond to FIG. 1.

The branches 3, 6 and 9 comprise coils of twice the conductor cross-section and one-half the turns number of the coils of the other phase-winding parts.

The coil-pitch remains 19 slots. The 6-pole connection is the parallel-star connection of FIG. 1 and the 8-pole connection is the series-star connection.

The 6-pole winding factor remains 0.867. The 8-pole winding factor becomes 0.587. The air-gap, flux-density ratio $B_6/B_8$ is reduced to 1.01.

Compared with the winding of FIG. 2, the new winding of FIG. 4 has the same, or slightly better, 8-pole running performance and the starting and pull-out torque is much improved.

A second example of the application of the principles of the present invention is a small, 6-pole/8-pole, P.A.M. motor wound on a 36-slot stator.

Figure 5:
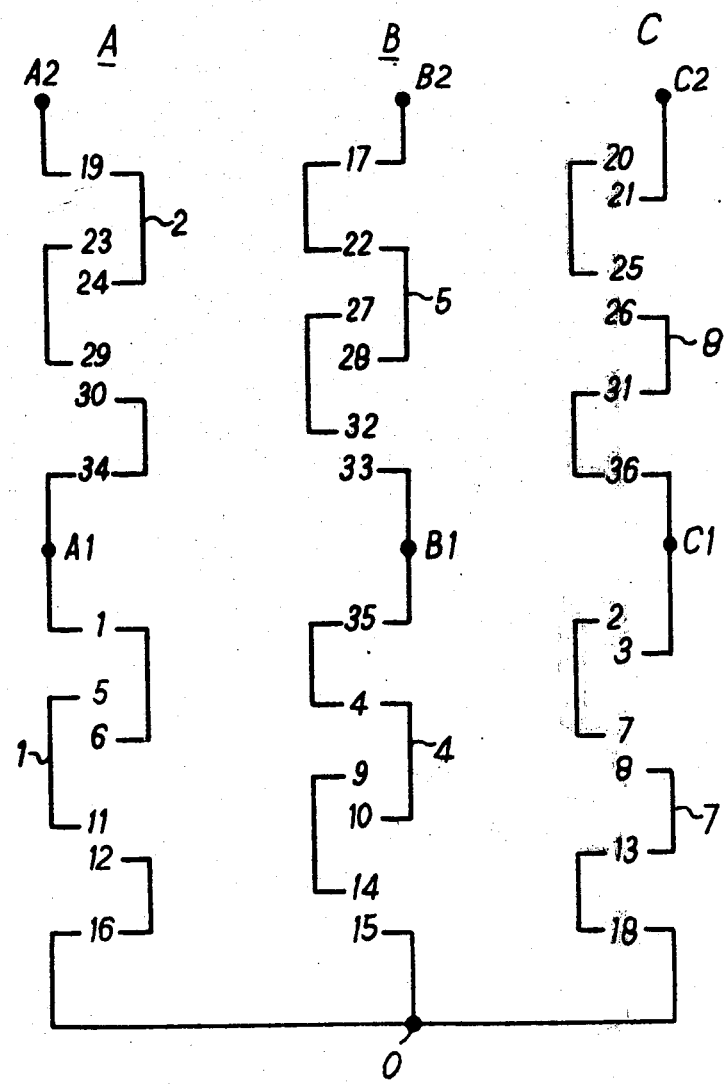
FIG. 5 is a winding diagram of the stator winding of a 6-pole/8-pole, 3-phase, pole-amplitude modulation machine, wound in 36 slots.

FIG. 5 is the winding diagram of a known form of such a motor. The terminal and winding references correspond to those used in FIG. 2. The coil pitch is 6 slots.

For 6-pole working, the 3-phase supply terminals are connected to winding terminals A1, B1 and C1. Terminals A2, B2 and C2 are joined together.

For 8-pole working, the supply terminals are connected to winding terminals A2, B2 and C2. Terminals A1, B1 and C1 are isolated.

The 6-pole winding factor is 0.879. The 8-pole winding factor is 0.721. The air-gap, flux-density ratio $B_6/B_8$ is 1.23 and this ratio is too high to give a good starting torque for 8-pole working.

Figure 6:
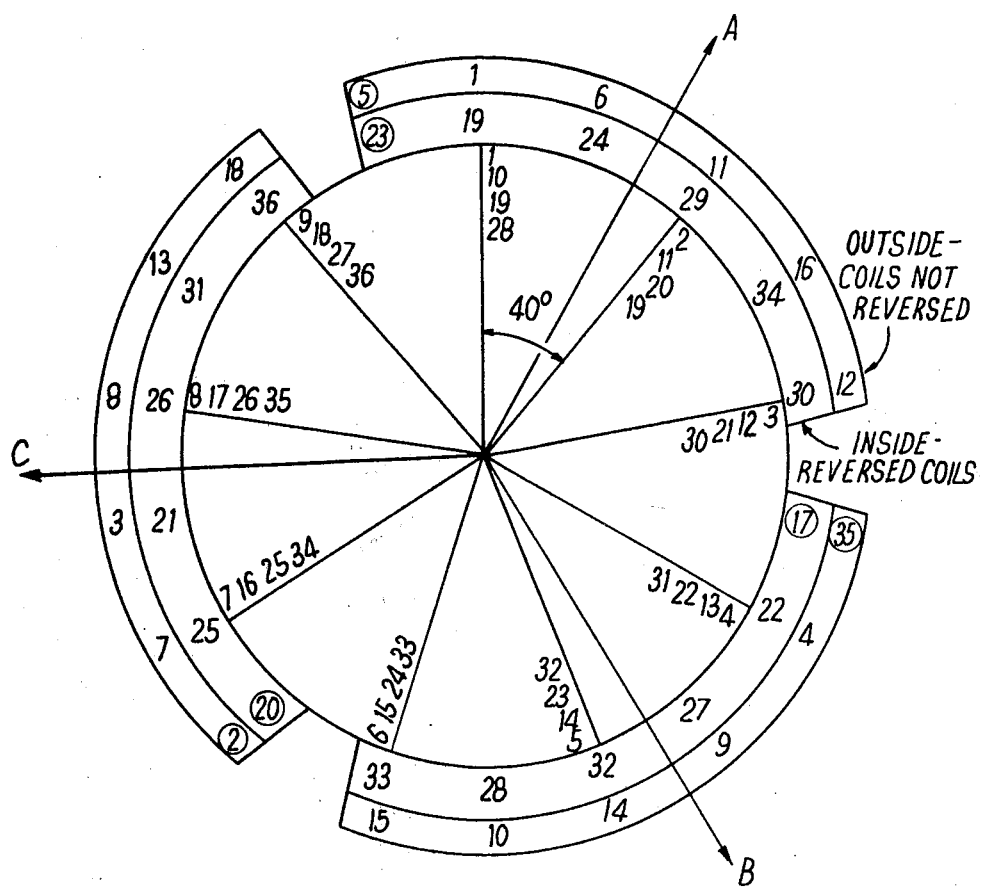
FIG. 6 is the 8-pole slot-vector diagram for the 6-pole/8-pole machine of FIG. 5, with omitted coils.

FIG. 6 is the slot-vector diagram for the winding of FIG. 5 in its series-star, 8-pole connection.

Since the winding comprises twelve coils per phase-winding, that is, six coils per half phase-winding, it is clearly desirable to remove from circuit one coil of each half of each phase-winding, in the 8-pole connection, in order to increase the corresponding flux-density.

In this winding, there are three possibilities only. There are to remove one coil from each half phase, corresponding to slot-vectors spaced, respectively, by 10°, 30° and 50° from the resultant vector for each phase. Computation of the m.m.f. waveform and layer (spread) factors for each case shows that the second of these alternatives gives an air-gap flux-density ratio, $B_6/B_8$, equal to 1.02, and the third alternative a value equal to 1.09. However, the m.m.f. waveform in the latter case is so much better than in the former case that the 50° spacing is preferred, even though the value of the air-gap flux-density ratio is rather higher than the ideal value. The coils for omission from circuit in the preferred case are shown by the ringed numbers in FIG. 6.

Figure 7:
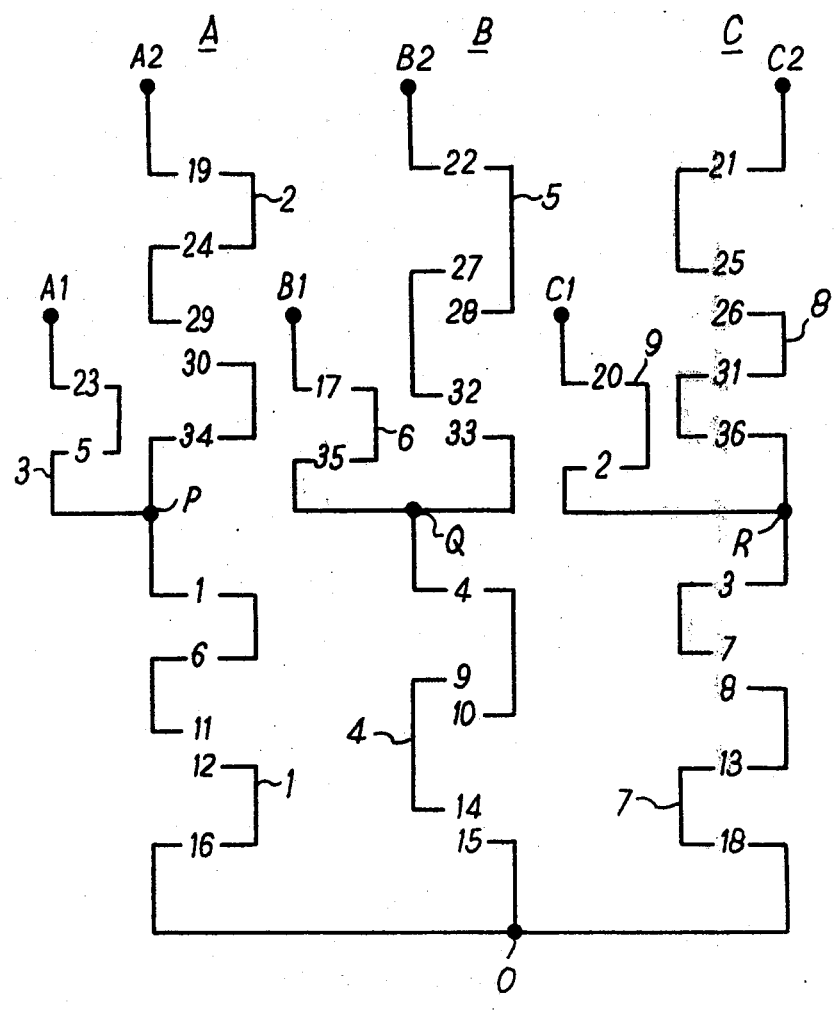
FIG. 7 is a winding diagram of a 6-pole/8-pole machine according to the invention, wound in a 36-slot frame and using the stator winding circuit of FIG. 1.

FIG. 7 is the winding diagram of the modified stator winding. The terminal and winding references correspond to those of FIG. 1 and the coil and slot references correspond to those of FIG. 5.

The coils of the branches 3, 6 and 9 are wound with conductors of double the cross-section and with one-half the turns number, compared with the coils of all the other winding parts.

The parallel-star, 6-pole connection and the series-star, 8-pole connection are effected as shown in FIG. 1. The arrangement gives a 6-pole winding factor of 0.879, as before, and an 8-pole winding factor reduced to 0.637. The air-gap, flux-density ratio $B_6/B_8$ is reduced to 1.09.

Compared with the basic winding of FIG. 5, the new winding of FIG. 7 has much improved starting torque at 8-pole working.

What we claim is:

1. For use in a 3-phase alternating current, pole-amplitude modulation pole-changing electric machine, having a 3phase stator winding comprising three phase-windings, each phase-winding having two phase-winding parts, arranged for alternative series/parallel connection together, said phase winding parts comprising a majority but not all of the coils of the phase winding, which parts are serially connected together for a first pole-number and connected together in parallel for a second pole-number; a method of connecting the said coils of each phase-winding to provide an air-gap flux density ratio, for the two pole-numbers, which is close to unity, said method comprising modifying the said machine from a form in which said coils are identical throughout and are all energized for each pole-number, in that the said two phase-winding parts together comprise all coils of the phase-winding, by excluding selected coils from circuit in the serial connection for one-pole number; the step of excluding selected coils comprising determining the slot-vector for all coils of all three phase-windings when all coils are energized in the said parallel connection, thereby to define three adjoining phase vector groups, one group for each phase, each group subtending 120° around the stator winding periphery and selecting the said selected coils in groups of three pairs, each pair of the three pairs occupying a corresponding vector angular position within each of the three said phase vector groups, each coil of a pair occupying the same vector angular position in the same phase vector group, one coil of the pair being selected from that phase-winding part which is reversed in circuit by said alternative series/parallel connections and the other coil of the pair being selected from that phase-winding part which is not reversed in circuit thereby.

2. A method as claimed in claim 1, in which the angular vector position of selected coil pairs within the phase vector group concerned is chosen to achieve a required reduction in winding factor, coil pairs selected near the center of a phase vector group providing greater reduction in winding factor than coil pairs selected away from the center.

3. A method as claimed in claim 1, in which said exclusion is achieved by winding the said selected coils with one-half turns number of double cross-sectional conductor, relatively to coils of the said phase-winding parts, and by connecting the said selected coils in branch with the said phase-winding parts, the said selected coils being serially connected in circuit solely with the parallel arrangement of said phase-winding parts.

4. A 3-phase alternating current, pole-amplitude modulation pole-changing, electric machine, having a 3-phase stator winding comprising three phase-windings, each including two phase-winding parts, which parts are serially connected together for a first pole-number and connected together in parallel for a second pole-number, said phase-winding parts including a majority of the coils of the phase-winding concerned but excluding selected coils thereof, said selected coils being excluded from circuit in the serial connection for one pole-number, said selected coils together comprising at least one group of three coil-pairs, one coil-pair from each phase-winding, the coil-pair of each phase-winding representing corresponding slot-vector angular positions within the corresponding phase vector group, and the two coils of each pair representing the same slot-vector angular positions.

5. A 3-phase alternating current electric machine as claimed in claim 4, in which said selected coils comprise multiple coil-pairs from each phase-winding.

6. A 3-phase alternating current electric machine as claimed in claim 4, having the said phase-winding parts are connected alternatively in parallel star/star, the said selected coils are connected serially together and in branch with the said phase-winding parts, and the said selected coils are connected in circuit solely in series with the parallel-connected phase-winding parts.

7. A 3-phase alternating current electric machine as claimed in claim 6, wherein the said selected coils are wound with one-half turns number of double cross-section conductor, compared with the coils connected in said phase-winding parts.

8. A 3-phase alternating current electric machine as claimed in claim 4, wherein for first and second pole-numbers N and (N+1) pole-pairs respectively, said selected coils are excluded from circuit at the higher pole-number.

9. For use in a 3-phase alternating current, pole-amplitude modulation pole-changing electric machine, having a 3-phase stator winding comprising three phase-windings, each phase-winding having two phase-winding parts, adapted for alternative series/parallel connection together, said phase winding parts comprising most coils but not all coils of the phase winding, which parts are serially connected together for a first pole-number and connected together in parallel for a second pole-number; a method of connecting the said coils of each phase-winding by excluding selected coils from circuit in the said serial connection, for said one pole-number; the step of excluding said selected coils comprising (i) determining the slot-vectors for all coils of all three phase-windings when all coils are energized in the said parallel connection, thereby to define three adjoining phase vector groups, one group for each phase, each group subtending 120° around the stator winding periphery and (ii) selecting the said selected coils in groups of three pairs, each pair of the three pairs occupying a corresponding vector angular position within each of the three said phase vector groups, each coil of a pair occupying the same vector angular position in the same phase vector group, one coil of the pair being selected from that phase-winding part which is reversed in circuit by said alternative series/parallel connections and the other coils of the pair being selected from that phase-winding part which is not reversed in circuit thereby, whereby the resultant stator winding is of a different form from that in which the coils are identical throughout the winding and are all energized for each pole-number and in which the said two phase-winding parts together comprise all the coils of the phase-winding, and whereby to provde an air-gap flux-density ratio, for the two pole-numbers, which is close to unity.

10. a 3-phase alternating current, pole-amplitude modulation pole-number changing, electric machine having stator coils connected to provide three phase-windings of a 3-phase stator winding at each pole-number of the said machine, each phase-winding comprising one-third of all the said stator coils; said stator coils, as defined each one by the slot vector thereof, thus together defining three groups of slot vectors, one group for each phase, each group subtending an angle of 120° around the stator winding periphery; each phase-winding comprising first, second and third phase-winding parts together comprising all the stator coils of the said phase-windings; the first and second phase-winding parts comprising equal numbers of coils as each other and further comprising a majority but not all the stator coils of the said phase-winding, the third phase-winding part comprising the stator coils not included in said first and second phase-winding parts; said first, second and third phase-winding parts being all connected together at one end thereof; said first and second phase-winding parts being serially connected together in circuit and said third phase-winding part being omitted from circuit for a first pole-number of the said machine; said first and second phase-winding parts being connected in parallel with each other and said third phase-winding part being serially connected with the parallel combination of the first and second phase-winding parts for a second pole-number of the said machine; said third phase-winding parts further satisfying the following requirements:

each phase-winding includes the same number of pairs of stator coils in the third phase-winding part thereof;

said each pair of stator coils comprises two stator coils defined by coincident slot vectors;

when said number of pairs of stator coils is an even number, said coincident slot vectors of one pair of stator coils are symmetrical with the coincident slot vectors of another pair of stator coils within said 120° subtended angle of the slot vectors of each phase-winding; and the stator coils of said third phase-winding parts are wound with conductors of one-half the number and double the cross-section area as the conductors of stator coils of said first and second phase-winding parts.

* * * * *